(No Model.)
E. MIGNAULT.
UNIVERSAL ANGULAR KNUCKLE JOINT.
No. 267,706. Patented Nov. 21, 1882.
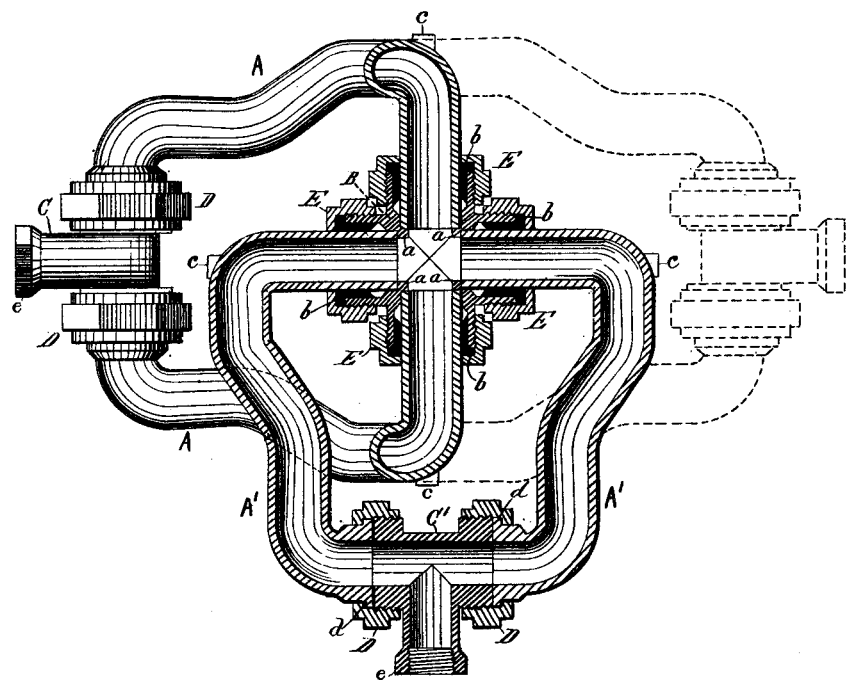
Witnesses.
John Buckler
F. W. Hanaford.
Eusebe Mignault,
Inventor.
By Worth Osgood,
Attorney.

UNITED STATES PATENT OFFICE.

EUSEBE MIGNAULT, OF TROY, NEW YORK, ASSIGNOR OF ONE-HALF TO MARY I. MIGNAULT, OF SAME PLACE.

UNIVERSAL ANGULAR KNUCKLE-JOINT.

SPECIFICATION forming part of Letters Patent No. 267,706, dated November 21, 1882.

Application filed August 19, 1882. (No model.)

*To all whom it may concern:*

Be it known that I, EUSEBE MIGNAULT, of Troy, county of Rensselaer, and State of New York, have invented certain new and useful Improvements in Universal Angular Knuckle-Joints, of which the following is a full, clear, and exact description, reference being had to the accompanying drawings, and to the letters of reference marked thereon.

My improvements have relation to pipe-couplings for use in connection with pipes intended to convey air, gas, steam, water, or other fluids or liquids; and the object of my invention is to produce a simple, cheap, and reliable coupling, which, being interposed between two sections of a pipe or conduit, will furnish an adjustable or universal joint between said sections, so that they (the sections) may be inclined to any angle with respect to each other, or made to approach or recede from each other within certain limits, in the same manner and for like purposes as in the case of the elastic joint or coupling heretofore commonly employed. The elastic joint or hose above referred to affords, of course, all the desired adjustments between the connected sections of the conduit, but, being made principally, if not wholly, of rubber, is defective in lasting or wearing qualities, is easily affected by heat and by many liquids and gases, deteriorates upon exposure to the atmosphere, is not easily made to withstand high pressures, and when damaged in any part is practically incapable of being repaired.

To accomplish the aforesaid objects of my invention, and to obviate the difficulties or disadvantages attending the use of the elastic joint or hose, my improvements involve certain novel and useful peculiarities of construction, relative arrangements or combinations of parts, and principles of operation, all of which will be herein first fully described, and then pointed out in the claims.

In the accompanying drawings, forming part of this specification, I have shown a horizontal section and partial plan of a metallic pipe-coupling or universal pipe-joint constructed and arranged for operation in accordance with my invention, the dotted lines indicating one of the positions to which one of the two sections of the coupling may be adjusted. The coupling is composed of two similar sections or parts, each section being capable of being rotated independently of the other section, turning upon axes at right angles to each other, and each having two hollow branches or arms, as A A and A' A'. The connecting piece or box B for the reception of the ends of the branches or arms A A and A' A' is provided with two passages at right angles to each other, and these passages are bored or reamed out, so as to have ledges $a\ a$, against which the inner ends of the branches abut, and are again enlarged for the reception of packing-glands $b\ b$. The arms are preferably made of cast metal, and the ends which enter the connecting-piece are accurately turned to fit the bores, the teats $c\ c$ being provided for convenience in centering the parts in a lathe, and the bore of the entering part of the arms being preferably made to coincide with the bores in the connecting-piece, substantially as shown. The other ends of the arms or branches are provided with flanges $d\ d$, corresponding in diameter with the exterior or hollow T-pieces C C'. The packing-glands $b\ b$ are provided with flanges, which project over or cover the squared ends of the connecting-piece B. The hollow branches are adjusted to their seats in the coupling-piece B and upon the T-pieces, and are held in proper relative position by the coupling-nuts D D, which bring the flanges $d\ d$ firmly against the ends of the T-pieces, so as to hold these parts immovable with respect to each other. The packing-nuts E E, engaging with the connecting-piece B, compress the packing-glands and form fluid-tight joints about the entering ends of the arms or branches, at the same time permitting the required rotating movements of the arms with respect to the connecting-piece.

Any approved means of connecting the improved universal coupling with the ends of the pipes or conduits to be joined may be adopted. I prefer, however, to provide the tail of the T-piece with an internal screw-thread or winding, to receive a corresponding thread upon the end of the section with which connection is to be made, the tail being strengthened by a suitable enlargement, as at $e$, the same being squared for the reception of a wrench. The coupling being thus constructed and arranged, it is apparent that either part thereof may be revolved through an angle of about one hundred and eighty degrees independently of the other part, and both parts may be variously adjusted with reference to each other, forming an articulated or universal coupling, by means of which the attached sections of the pipe or conduit may be variously moved or inclined. The branches forming a double passage-way all around may be made of smaller interior diameter than the T-pieces or the main conduit and afford sufficient passage-way for air or steam, &c.

The advantages and uses of the improved coupling are well illustrated in the case of the air-brake or steam-heating pipes on a railroad-train, to connect which the improved device is admirably applied, permitting all the usual movements of the two parts of the pipe (attached to different cars) without in any way interfering with the efficiency of the coupling. It is also calculated for use in other situations wherein its numerous peculiar characteristics will recommend it for adoption. Being of metal, it is durable, and not affected by gases, acids, or heat. Its parts may be easily disjointed for packing or for repairs of any part in case of necessity, and it is well adapted to answer all the purposes or objects of the invention, as previously stated.

Having now fully described my invention, what I claim as new herein, and desire to secure by Letters Patent, is—

1. In a pipe-coupling of the character herein set forth, the two sections, each composed of two similar hollow branches or arms, the said sections being mounted in a connecting-piece and turning therein about axes at right angles to each other, substantially as and for the purposes set forth.

2. In a universal pipe-coupling, the combination, with the connecting-piece having the two bores at right angles to each other, of the four hollow branches or arms packed in the connecting-pipe, substantially as shown, the arms of each section of the coupling being rigidly united by the T-pieces and their adjustable coupling-nuts, substantially as shown and described.

3. In a universal pipe-coupling, the combination of the connecting-piece B, having two bores at right angles to each other, the branches or arms A A A' A', the packing-glands and packing-nuts, the hollow T-pieces C C', and the coupling-nuts D D, substantially as shown and described.

4. In a universal pipe-coupling composed of two sections movable independently of each other and at right angles to each other, the connecting-piece bored and reamed, substantially as explained, so as to leave the ledges $a$ $a$, against which the inner ends of the branches or arms are made to abut, substantially as and for the purposes set forth.

5. The combination, with the two similar arms or branches of the universal pipe-coupling, of the connecting hollow T-piece, the tail of which is threaded and strengthened by the enlargement on its exterior, substantially as shown, and for the purposes set forth.

In testimony that I claim the foregoing I have hereunto set my hand in the presence of two witnesses.

EUSEBE MIGNAULT.

Witnesses:
JOHN BUCKLER,
WORTH OSGOOD.